UNITED STATES PATENT OFFICE.

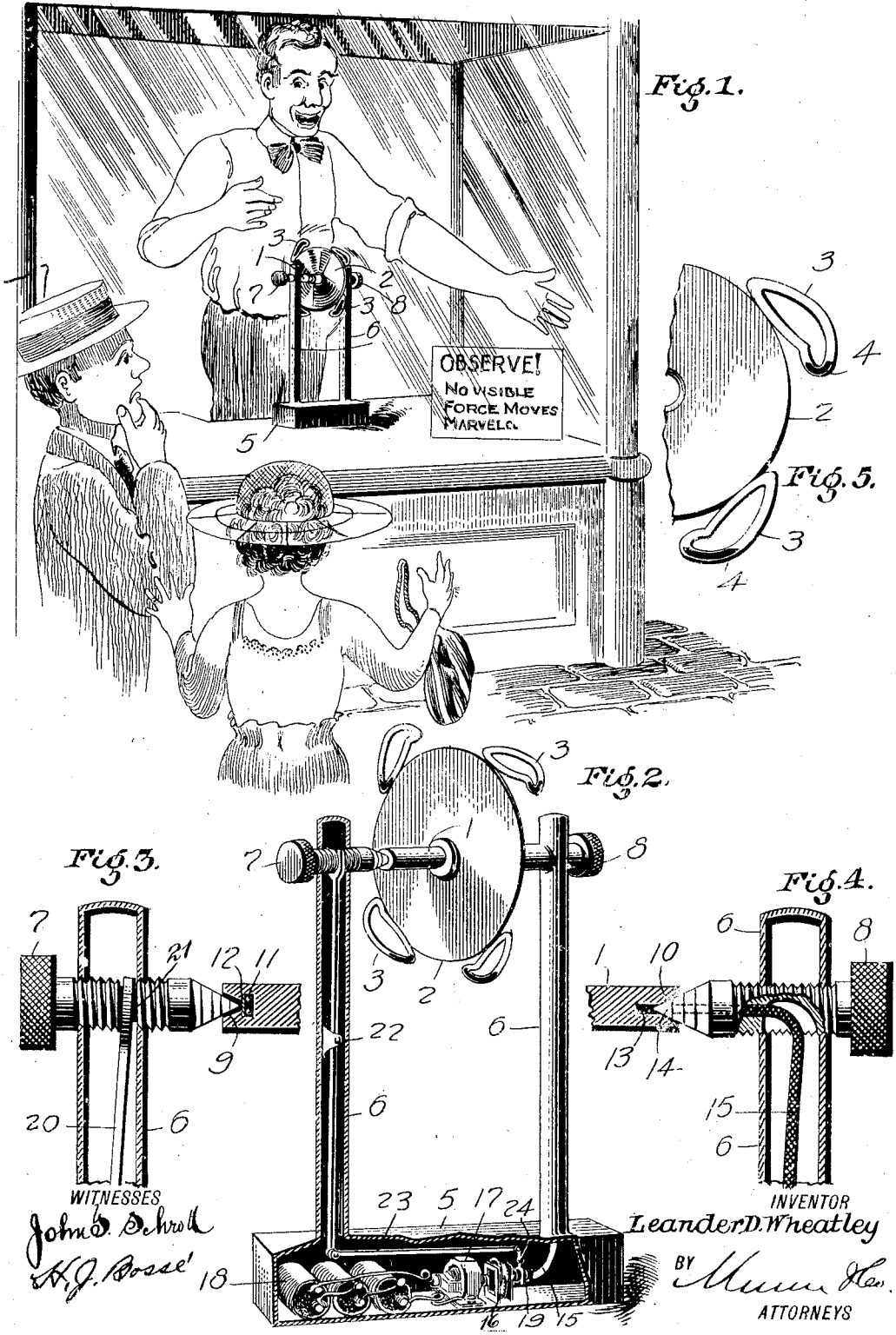

LEANDER DAVIS WHEATLEY, OF PENDLETON, OREGON.

ADVERTISING DEVICE.

1,344,250. Specification of Letters Patent. Patented June 22, 1920.

Application filed August 8, 1917, Serial No. 185,095. Renewed November 7, 1919. Serial No. 336,472.

*To all whom it may concern:*

Be it known that I, LEANDER DAVIS WHEATLEY, a citizen of the United States, and a resident of Pendleton, in the county of Umatilla and State of Oregon, have invented new and useful Improvements in Advertising Devices, of which the following is a specification.

My invention is an improvement in advertising devices, and has for its object to provide a device of the character specified which will simulate perpetual motion, wherein a wheel is provided and a support for the wheel having hollow standards or uprights, the wheel having a shaft provided with recessed ends, and pointed set screws being threaded through the uprights to engage the recesses, one of the set screws having a rotatable point connected with a motor for operating the wheel, and the other set screw having means operated by the outward movement thereof to release the shaft for controlling the movement of the motor.

In the drawings:

Figure 1 is a perspective view of the device in use;

Fig. 2 is an enlarged perspective view with parts broken away;

Fig. 3 is a detail of the upper end of one of the uprights;

Fig. 4 is a similar view of the upper end of the other upright;

Fig. 5 is a partial side view of the wheel.

In the present embodiment of the invention, a shaft 1 is provided, to which is secured a wheel 2, and the said wheel carries a series of continuous tubes 3 of glass or other transparent material, and in each of which is arranged a small amount of mercury, as indicated at 4. It will be noticed that the tubes, which are approximately elliptical or egg shaped, but slightly irregular, having one end pointed, are arranged on the wheel in spaced relation, and with the pointed end toward the wheel.

A suitable support is provided for the wheel, the said support consisting of a hollow base 5 and hollow uprights 6, the said uprights being closed at their tops, as shown. Set screws 7 and 8 are threaded through the respective uprights, each of the set screws having its inner end pointed, as shown, and having its outer end provided with a knurled head for convenience in turning the same.

The shaft 1 has its ends recessed, as indicated at 9 and 10, respectively, and the pointed ends of the set screws engage these recesses. In one end of the shaft, namely, that end adjacent to the set screw 7, a ball bearing 11 is arranged, and a disk or plate 12 upon the bearing, the point of the set screw engaging the plate or disk. At the opposite end of the shaft, namely, that end engaged by the set screw 8, the tapering or conical recess 10 has an extension 13 which is cylindrical. This permits the recess to wear without interfering with the operation of the device.

The set screw 8 has a central bore which communicates by means of a lateral opening with the bore of the adjacent upright 6, and the point 14 of the set screw is rotatably connected with the set screw.

A flexible shaft 15 leads from the motor, to be presently described, in the base to the point, and is connected with the point in order to constrain the shaft and the wheel to rotate when the motor is in operation. This motor, as shown, is a mechanical motor, indicated at 16, or a clockwork, and the said clockwork is controlled by a spring. An electrical motor 17, which is supplied by current from a battery 18, is provided for rewinding the spring, the connection between the motor and the spring being an old and well known connection, and so arranged that when the spring runs down the motor will rewind the same. The connection between the shaft 15 and the motor is controlled by clutch mechanism, indicated generally at 19, and the said mechanism is operated by the set screw 7. A lever 20 is arranged in the upright 6 adjacent to the set screw 7, and the upper end of this lever is forked as shown, and engages an annular groove 21 in the set screw. The lever is pivoted intermediate its ends, as indicated at 22, and the lower end of the lever is connected by a link 23 with the upper end of the clutch operating lever 24.

In use, when the motor is running, the wheel will be rotated steadily, and the mercury, taking different positions in the endless tubes 3, will give the illusion of perpetual motion caused by the movement of the mercury. The peculiar arrangement of the tubes provides that the mercury will be at the outer end of the tubes on the downwardly moving side of the wheel and at the inner end of the tube on the upwardly moving side of the wheel. All the operating mechanism for the wheel is concealed, and should it be necessary for any reason to remove the wheel, either for the purpose of repair or to create a further illusion, the set screw 7 is turned outwardly to release the shaft. This outward turning of the set screw stops the rotation of the point 14, so that there is no movement of the set screw that will be visible with the wheel removed.

I claim:

1. An advertising device comprising a shaft having recessed ends, a wheel on the shaft, loop shaped tubes on the peripheries of the wheel, each tube having a small amount of mercury therein, a supporting frame comprising a hollow base containing a motor and hollow uprights communicating with the base, set screws threaded through the uprights and having pointed ends engaging the recesses, one of the screws having the pointed end journaled on the screw, and a flexible shaft connecting the motor to the point and passing through the upright and the screw, a lever pivoted intermediate its ends in the other upright and connected to the controlling mechanism of the motor at its lower end to stop the rotation of the point when the upper end of the lever is swung outward, the upper end of the lever engaging the adjacent set screw to be operated thereby when the said set screw is turned outward.

2. An advertising device comprising a shaft having recessed ends, a wheel on the shaft, a supporting frame comprising a hollow base containing a motor and hollow uprights communicating with the base, set screws threaded through the uprights and having pointed ends engaging the recesses, one of the screws having the pointed end journaled on the screw, and a flexible shaft connecting the motor to the point and passing through the upright and the screw, and means controlled by the movement of the other set screw for controlling the connection between the motor and the point.

3. An advertising device comprising a shaft having recessed ends, a wheel on the shaft, a supporting frame comprising a hollow base and containing a motor and hollow uprights communicating with the base, set screws threaded through the uprights and having pointed ends engaging the recesses, one of the screws having the pointed end journaled on the screw, and a flexible shaft connecting the motor to the point and passing through the upright and the screw.

LEANDER DAVIS WHEATLEY.